Dec. 24, 1935.  E. C. CROCKER  2,025,340
STUMP PULLER
Filed April 15, 1935  2 Sheets-Sheet 1
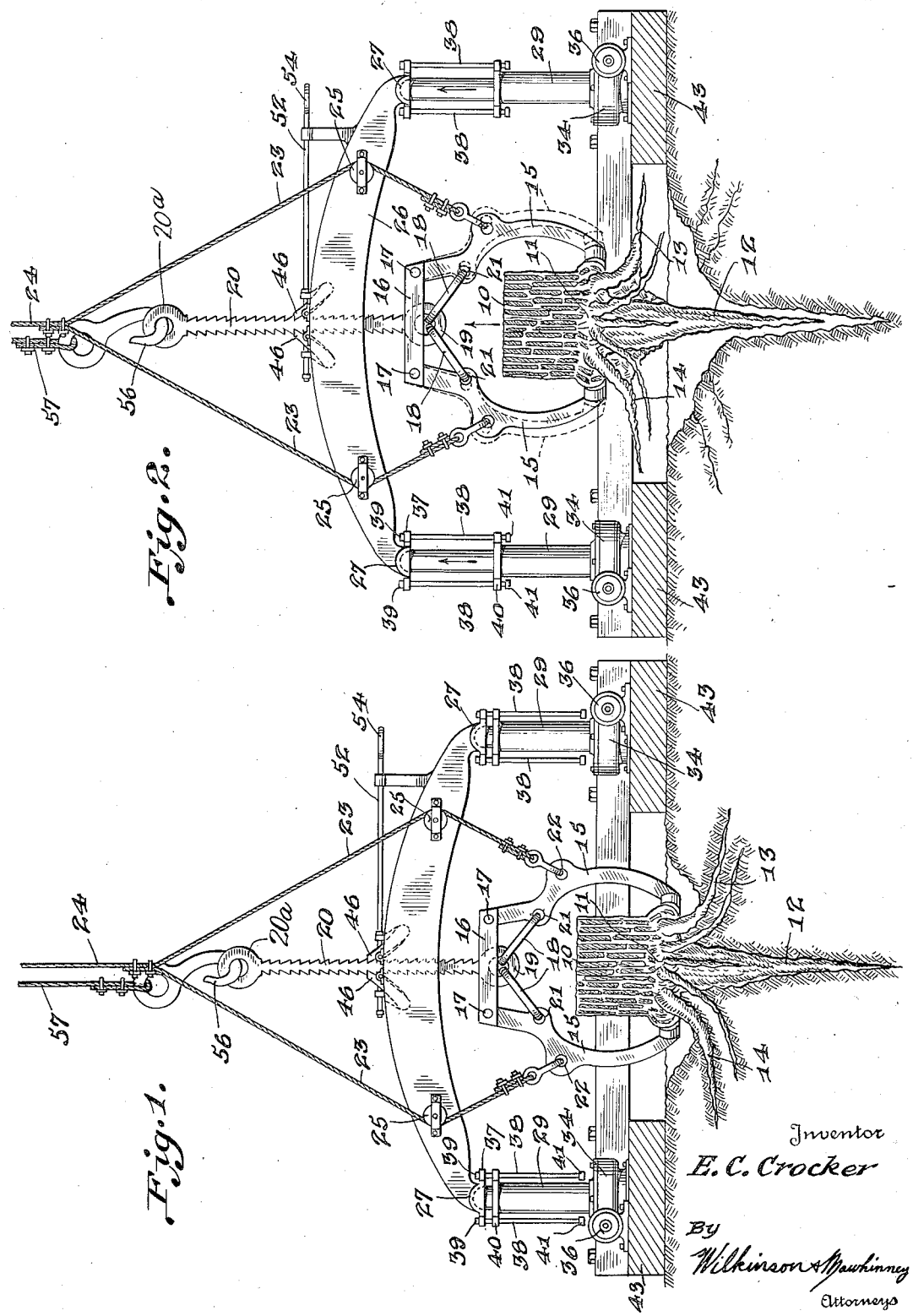
Inventor
E. C. Crocker
By Wilkinson & Mawhinney
Attorneys Dec. 24, 1935.  E. C. CROCKER  2,025,340
STUMP PULLER
Filed April 15, 1935   2 Sheets-Sheet 2
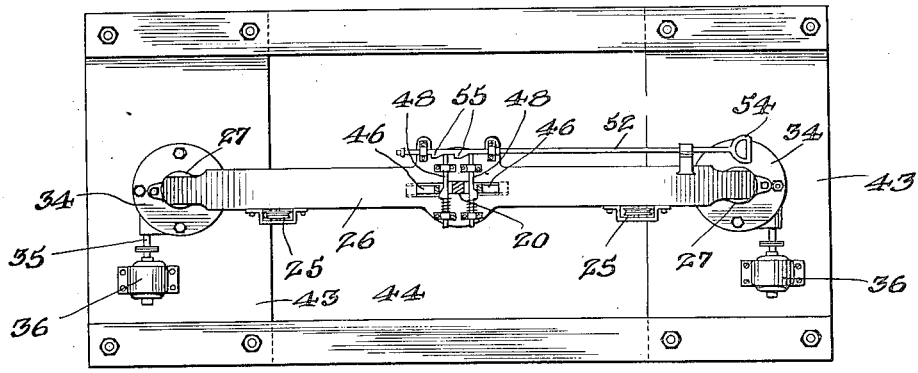
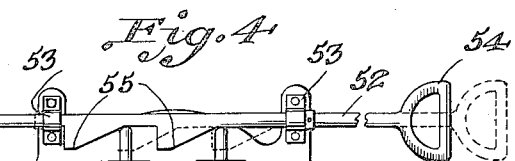
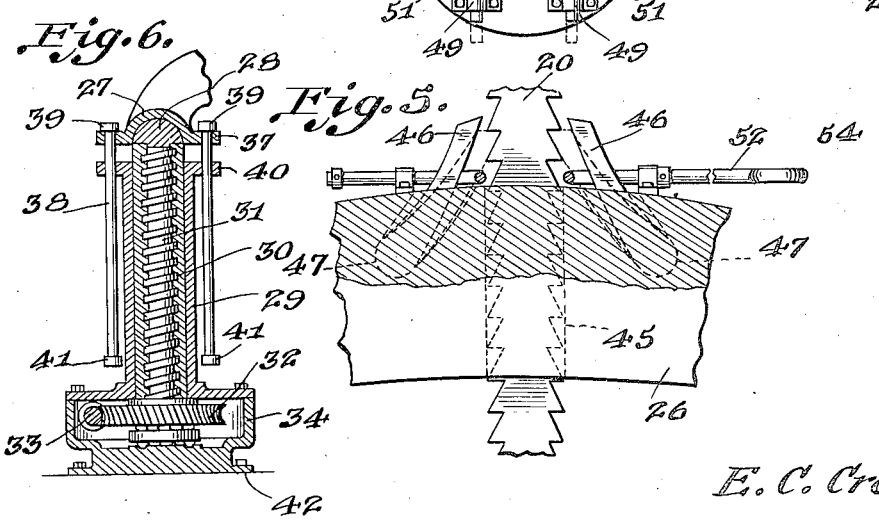
Inventor
E. C. Crocker
By Wilkinson & Mawhinney
Attorneys Patented Dec. 24, 1935

2,025,340

UNITED STATES PATENT OFFICE 2,025,340

STUMP PULLER

Eben C. Crocker, Gulfport, Miss.

Application April 15, 1935, Serial No. 16,467

6 Claims. (Cl. 214—115)

The present invention relates to improvements in stump pullers and has for an object to provide a power stump puller capable of exerting an immense amount of lifting pressure such as is required to withdraw the complete stump and its roots wholly from the ground.

Another object of the invention is to provide an improved stump puller in cooperation with a crane whereby the stumps may be expeditiously and quickly removed in great numbers.

A further object of the invention is to provide an improved stump puller in which the use of power lifting jacks is employed in connection with a crane by which the lifting jacks may be transported and moved from place to place quickly in position over the stump to be extracted by power derived from the jacks.

The form of the invention shown in the drawings is made especially applicable to pine tree stumps which possess a swelling beneath which the tongs of the stump puller are adapted to engage.

It is important to extract the entire stump as valuable by-products such as rosin and turpentine can be recovered from these stumps.

With the foregoing and other objects in view the invention will be more fully described hereinafter and more particularly pointed out in the appended claims.

In the drawings in which like parts are denoted by like reference characters throughout the several views, Figure 1 is a side elevation of an improved stump puller showing the device in the initial position.

Figure 2 is a similar view showing the jacks in the raised position and the stump extracted.

Figure 3 is a top plan view of the device.

Figure 4 is an enlarged plan view of the beam with parts broken away and parts shown in section and illustrating the dog releasing device.

Figure 5 is a sectional view taken on the line 5—5 in Figure 4 and

Figure 6 is a vertical section taken through one form of power jack which may be employed.

Referring more particularly to the drawings, 10 designates a stump of any kind or character, for instance a pine tree stump having a swelling indicated at 11.

Figure 1 shows approximately the position occupied in the ground by this stump 10 with the swelling 11 approximately in the earth level. The roots are indicated at 12, 13, and 14. It is only necessary to remove a shovel full or so of earth about the swelling 11 to permit the jaws of the tongs 15 to engage beneath this swelling 11.

While it is preferred that these jaws grip the stump at the point illustrated it will be quite apparent to those skilled in the art that the tongs may grip the stump at any desired point either above or below the swelling and it is not always necessary to make any excavation about the swelling at all.

The tongs 15 are connected together at their upper ends by the bars 16, the tongs being pivoted to the bars 16 as indicated at 17. The tongs are supported by links 18 from the eye 19 of a rack bar 20 which is supported from the crane as hereinafter described. The lower divergent ends of the links 18 connect with perforated enlargements 21 made on the inner sides of the tongs 15. On the same tongs but on the outside portions thereof and below the perforated enlargements 21 are other perforated enlargements 22 to which the lower ends of the branches 23 of the trip cable 24 are affixed. The branch cables 23 extend over sheaves 25 carried by the side of the beam 26.

This beam 26 is adapted to be supported and raised by the use of two or more power jacks, two such jacks being illustrated as connected to the ends of the beam 26. Sockets 27 are made at the ends of the beams to receive the ball heads 28 of the jacks. These heads move universally in the sockets 27 and permit the jacks to adapt themselves to uneven alignments.

One form of jack found to be useful in connection with the invention is illustrated in Figure 6 and is a screw type of power jack. This jack consists of a casing 29 having a vertically movable internally threaded sleeve 30 guided therewithin and raised and lowered by means of a feed screw 31 passing up through the sleeve and in threaded engagement therewith. The feed screw is driven by a worm wheel 32 which in turn is driven by a worm 33. The worm wheel and the worm constitute a speed reducer and are contained within a base casing 34. A worm shaft 35, shown in Figure 3, extends tangentially out of the base casing 34 and is coupled to the armature shaft of an electric motor 36 or other source of power.

Reverting to Figure 6 the beam is provided with laterally extending lugs 37 carrying the lifting rods 38, the heads 39 of which overly the lugs 37 which are perforated to receive the rods 38. The casing 29 of the jack is also provided with outstanding perforated lugs 40 in alignment with the lugs 37 to receive slidably therethrough the rods 38 by arresting the withdrawal of the rods from the jacks by reason of the heads or nuts 41 carried upon the lower ends of the rods engaging beneath the lugs 49 when the jacks are raised for instance to the position shown in Figure 2.

This construction enables the crane to lift the entire device including the beam 26, the jacks, tongs and stump and to transport the same to some desired destination of disposal of the stumps.

Base flanges 42 formed on the jacks enable the jacks to be bolted or otherwise secured to platforms 43. These platforms are movable with the jacks and with the entire stump puller and may be freely lifted off the ground by the crane. These platforms, as shown in Figure 3, are preferably connected together by spacing bars 44 which will retain the relative position of the two platforms throughout the transportation of the device in the air by the action of the crane so that the apparatus can be readily settled over a future stump without the platforms swinging together or getting in the way.

This construction also prevents the platforms from getting in the way of a proper adjustment of the tongs 15.

The rack bar 20 moves freely up and down through an opening 45 made in the central portion of the beam 26 and such rack bar is formed with teeth upon both of its vertical edges, the teeth being inclined downwardly and outwardly and ending in substantially right-angular horizontal shoulders admitting of the rack bar being gripped by the dogs 46.

These dogs 46 have enlarged rounded lower ends which fit within similarly formed sockets 47 in the beam 26 and they are thus mounted to pivot toward and from the rack bar. See, for instance, the two positions shown in Figure 5. The weights of the dogs will cause the same to automatically descend into position against the rack bar thus checking the descent of the rack bar until the dogs 46 are forcibly moved back out of engagement. Any appropriate dog releasing device may be used for this purpose, one form of which is shown in the drawings, particularly in Figure 4. In this figure slide rods 48 are shown as having a limited back and forth movement in the straps or guides 49. Cams 50 are carried by the rods 48 and adapted to engage beneath the dogs 46. Coil springs 51 wound about the rods 48 between the guides 49 at one end and the cams 50 cause the rods 48 to seek a position in which the cams 50 pry the dogs 46 away from the rack bar, or in other words to a releasing position. The rods 48 are moved to a non-releasing position by means of an operating rod 52 slidable in guides or bearings 53 upon the beam 26 and extending at substantially right-angles to the rods 48. The operating bar 52 may be manipulated through the use of a handle 54 and carries cams 55 positioned to engage the ends of the rods 48.

When the operating bar 52 is pulled to the right, as shown by dotted lines in Figure 4, the inclined surface of the cams 55 causes the rods 48 to ride therealong forcing the rods 48 inwardly compressing the springs 51 and shifting the cams 50 from beneath the dogs 46, thus allowing the dogs by their inherent weight to settle against the toothed sides of the rack bar 20 in which position they will engage the shoulders of the teeth and hold the rack bar against further descent through the beam 26. When the operating bar 52 is shifted back to the left or full line position illustrated in Figure 4, the cams 55 release the rods 48 and the coil springs 51 move the cams 50 underneath the dogs 46 shifting them outwardly to the releasing position. In such position the rack bar 20 and the tongs 15 may be lowered and settled over the stump.

The rack bar 20 is formed with an eye 20a engaging a hook 56 suspended from the load line 57 of a crane.

In the use of the device the crane is manipulated in the usual way to bring a stump pulling device into a correct vertical position above the stump to be pulled. The load line 57 is thereupon lowered enabling the platforms 43 to take up positions upon the ground at opposite sides of the stump 10 and the tongs 15 to settle themselves about the stump.

Local adjustment of the tongs may be made by the operation of the dogs 46 and the shifting of the rack bar 20 up or down in the beam 26. During the descent of the device, the trip line 24 which is a part of the crane will be drawn taut to hold the jaws of the tongs 15 apart whereby the same may be readily lowered over a stump. The trip line 24 is then released and by reason of the great weight of the tongs 15, the jaws will close in upon the stump. The jacks are thereupon put into operation, as for instance by closing the circuit through the electric motors 36. Such jacks then begin to elevate the beam 26 irrespective of any action of the crane. In doing so the dogs 46 lift the rack bar 20 which rack bar in turn exerts an upward pulling pressure upon the links 19 thus causing the tongs 15 to be drawn together about their pivotal connections 17. The jaws of the tongs are thus required to bite into the stump. These power jacks exert a tremendous lifting pressure upon the beam and upon the tongs and they are efficacious to lift out the complete stump including the roots as shown in Figure 2. When the root is completely extracted the crane is put in operation and the entire stump pulling device with the attached stump is lifted and transported to a selected destination for the stumps from which they may be afterwards removed for the purpose of recovering the rosin, turpentine and other valuable constituents of the same which reside not only in the stumps themselves but in the roots as well.

When the point of disposal is reached the trip line 24 is drawn up, opens the jaws and permits the stump to drop. The apparatus is then in readiness for subsequent operation.

The motors may be operated either by direct or remote control.

It will be obvious that various changes may be made in the construction, combination and arrangement of parts which could be used without departing from the spirit of my invention and I do not mean to limit the invention to such details except as particularly pointed out in the claims.

Having thus described my invention, what I claim and desire to secure by Letters Patent of the United States is:—

1. An improved stump puller comprising a beam, jacks supporting the end portions of the beam, a bar slidable with respect to an intermediate portion of the beam, means for holding said bar in adjusted position, stump engaging tongs carried by said bar, and lifting means for said beam independently of said jacks.

2. An improved stump puller comprising a beam, jacks supporting the end portions of the beam, a rack bar slidably mounted through said beam, dogs on the beam for engaging the rack bar, releasing means for the dogs on said beam, lifting means connected to said rack bar, and stump engaging tongs also connected to said rack bar.

3. An improved stump puller comprising in combination with a crane load line and crane trip line, a bar carried by the crane load line, stump engaging means carried by the bar, a beam, means on the beam for lifting the bar with the beam, and jacks universally connected with the end portion of said beam for raising the beam and the bar independently of the lifting action of the crane load line.

4. An improved stump puller comprising, in combination with a crane load line and a crane trip line, a bar carried by the load line, pivoted tongs, means connecting the tongs below their pivot points with the rod, means also connecting said tongs with the trip line, a beam, means carried by the beam for lifting the rod therewith, jacks universally carried by the end portions of the beam, and platforms carried by said jacks.

5. An improved stump puller comprising a beam, jacks universally connected with the end portions of the beam to lift the same, lifting means for the beam independent of said jacks including connecting means with said beam, said jacks having motion limiting members thereon to lift the jacks from the ground after the same have been expanded and when the beam is lifted, and stump engaging means carried by said connecting means and adapted to be tightened on operating the lifting means.

6. A stump puller comprising a base platform, jacks having relatively movable members mounted thereon, a beam carried by the moving members of the jacks and permanently connected thereto, a lifting bar adjustably carried by said beam, stump engaging tongs pivotally suspended from said bar and adapted to be closed and raised with said bar and beam when the jacks are operated, means for lifting said bar to lift the stump tongs, beam, jacks and platform, and trip means for opening said tongs.

EBEN C. CROCKER.